United States Patent
Nakamura

(10) Patent No.: US 8,939,803 B2
(45) Date of Patent: Jan. 27, 2015

(54) CONDUCTIVE TERMINAL HAVING A MEANS TO REGULATE POSITIONS OF RECTANGULAR WIRES

(71) Applicant: Honda Motor Co., Ltd., Tokyo (JP)

(72) Inventor: Toru Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 110 days.

(21) Appl. No.: 13/896,266

(22) Filed: May 16, 2013

(65) Prior Publication Data

US 2013/0309918 A1 Nov. 21, 2013

(30) Foreign Application Priority Data

May 18, 2012 (JP) .................. 2012-114326

(51) Int. Cl.
```
H01R 4/28      (2006.01)
H01R 4/18      (2006.01)
H02K 3/52      (2006.01)
H02K 5/22      (2006.01)
H01R 11/12     (2006.01)
```
(52) U.S. Cl.
CPC ............ *H01R 4/182* (2013.01); *H02K 3/522* (2013.01); *H02K 5/225* (2013.01); *H01R 11/12* (2013.01); *Y02E 10/725* (2013.01)

USPC .......................................... 439/877
(58) Field of Classification Search
USPC .................................. 439/877–882
See application file for complete search history.

(56) References Cited

U.S. PATENT DOCUMENTS

| | | | | |
|---|---|---|---|---|
| 4,953,289 A * | 9/1990 | Schreck et al. | ................. | 29/863 |
| 6,869,301 B2 * | 3/2005 | Shimizu et al. | ............... | 439/324 |
| 7,494,301 B1 * | 2/2009 | Neaton | ...................... | 405/302.6 |
| 2004/0192100 A1* | 9/2004 | Shimizu et al. | ............... | 439/362 |
| 2013/0130566 A1* | 5/2013 | Onuma et al. | ................ | 439/877 |

FOREIGN PATENT DOCUMENTS

JP    2009-238696    10/2009

\* cited by examiner

*Primary Examiner* — Chandrika Prasad
(74) *Attorney, Agent, or Firm* — Mori & Ward, LLP

(57) ABSTRACT

A conductive terminal includes a connecting portion in which a plurality of wires each having a rectangular cross section are to be arranged in parallel and to which the wires are to be electrically connected. The connecting portion has a structure to cover the wires. The connecting portion includes a position regulation member to regulate positions of the wires in an arrangement direction in which the wires are arranged. The position regulation member is provided to face at least one side surface of a wire located at an end of the wires in the arrangement direction.

7 Claims, 7 Drawing Sheets

CONDUCTIVE TERMINAL HAVING A MEANS TO REGULATE POSITIONS OF RECTANGULAR WIRES

CROSS-REFERENCE TO RELATED APPLICATIONS

The present application claims priority under 35 U.S.C. §119 to Japanese Patent Application No. 2012-114326, filed May 18, 2012, entitled "Conductive Terminal." The contents of this application are incorporated herein by reference in their entirety.

BACKGROUND OF THE INVENTION

1. Field of the Invention

The present disclosure relates to a conductive terminal.

2. Discussion of the Background

There is known a rotating electric machine, such as a motor, for use in, for example, a hybrid vehicle. The rotating electric machine includes a stator having a plurality of stator cores, and a rotor provided rotatably relative to the stator. On each of the stator cores, a stator coil (winding) is wound.

The present applicant proposes a conductive connecting member that electrically connects a terminal of a bus ring for connecting stator coils of phases to an end of the corresponding stator coil in the above-described rotating electric machine (see, for example, Japanese Unexamined Patent Application Publication No. 2009-238696).

SUMMARY OF THE INVENTION

According to one aspect of the present invention, a conductive terminal includes a connecting portion in which a plurality of wires each having a rectangular cross section are to be arranged in parallel and to which the wires are to be electrically connected. The connecting portion has a structure to cover the wires. The connecting portion includes a position regulation member to regulate positions of the wires in an arrangement direction in which the wires are arranged. The position regulation member is provided to face at least one side surface of a wire located at an end of the wires in the arrangement direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
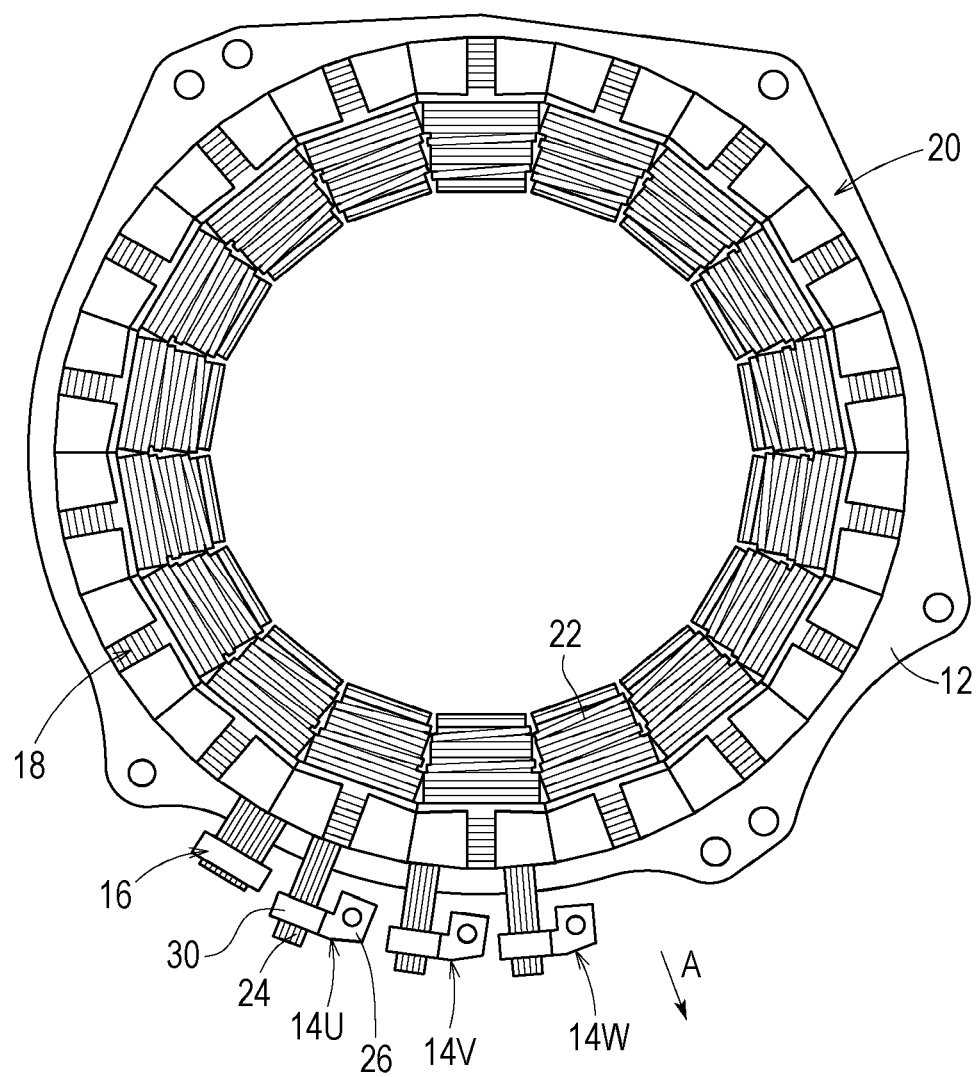
FIG. 1 is an overall front view of a rotating electric machine using conductive terminals according to an embodiment of the present disclosure.

The embodiments will now be described with reference to the accompanying drawings, wherein like reference numerals designate corresponding or identical elements throughout the various drawings.

The embodiment in which a connecting terminal according to the present disclosure is assembled to a stator will be described in detail below with reference to the attached drawings.

A stator 10 for a rotating electric machine (hereinafter simply referred to as a stator 10) is combined with a rotor (not illustrated) provided therein to constitute a rotating electric machine, and is used as a motor or a power generator as an example.

Figure 2:
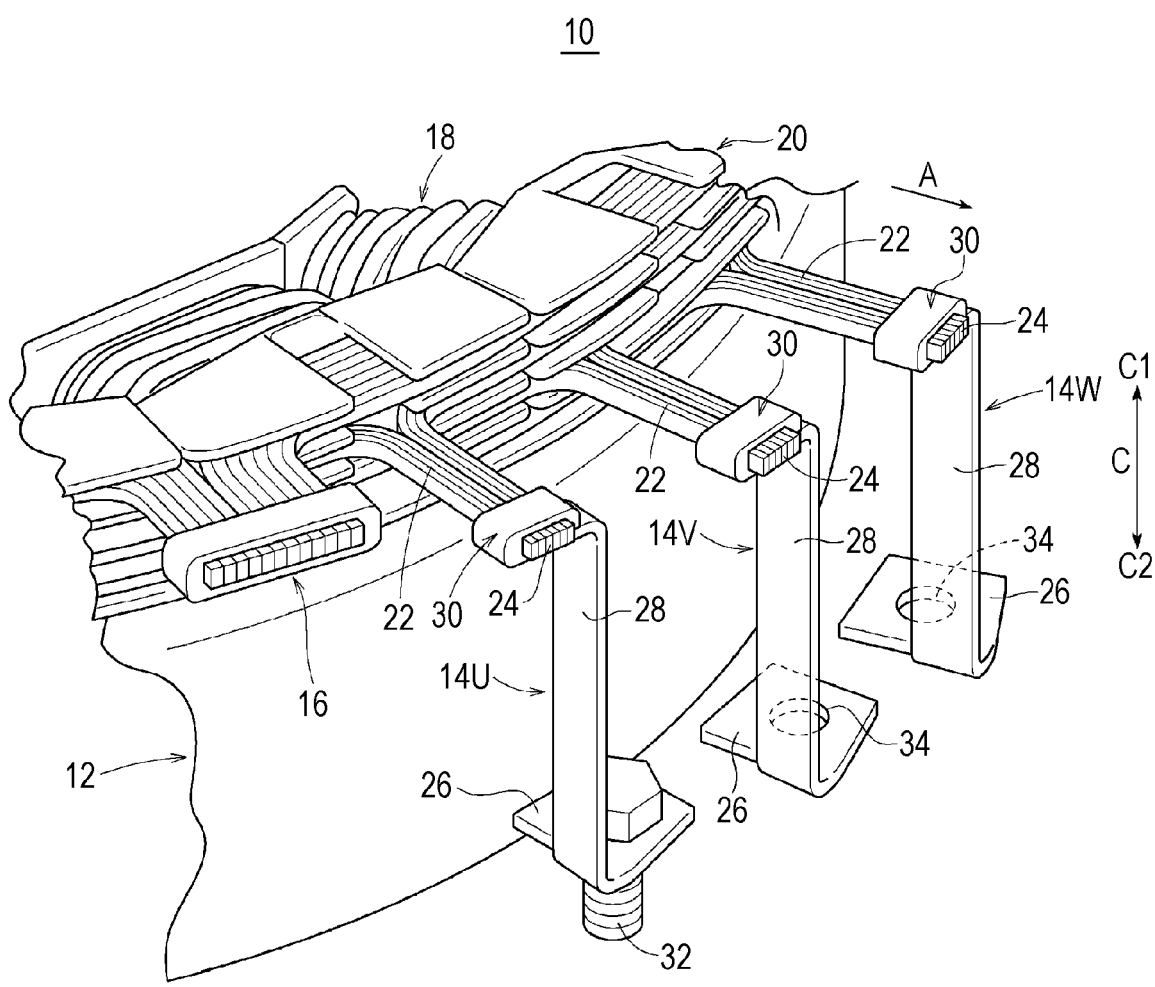
FIG. 2 is an enlarged perspective view of connecting terminals and their surroundings in the rotating electric machine illustrated in FIG. 1.

For example, the stator 10 is a three-phase Y-connection stator, and includes a hollow holder 12, three-phase connecting terminals (conductive terminals) 14U, 14V, and 14W provided on the holder 12, a neutral terminal 16 that forms a neutral point, and a stator core 20 formed by a plurality of divided cores 18 arranged in an annular form along an inner peripheral surface of the holder 12, as illustrated in FIGS. 1 and 2. The divided cores 18 have U-, V-, and W-phase coils (windings) 22, and are integrally held by the holder 12 provided on an outer periphery thereof.

Figure 3:
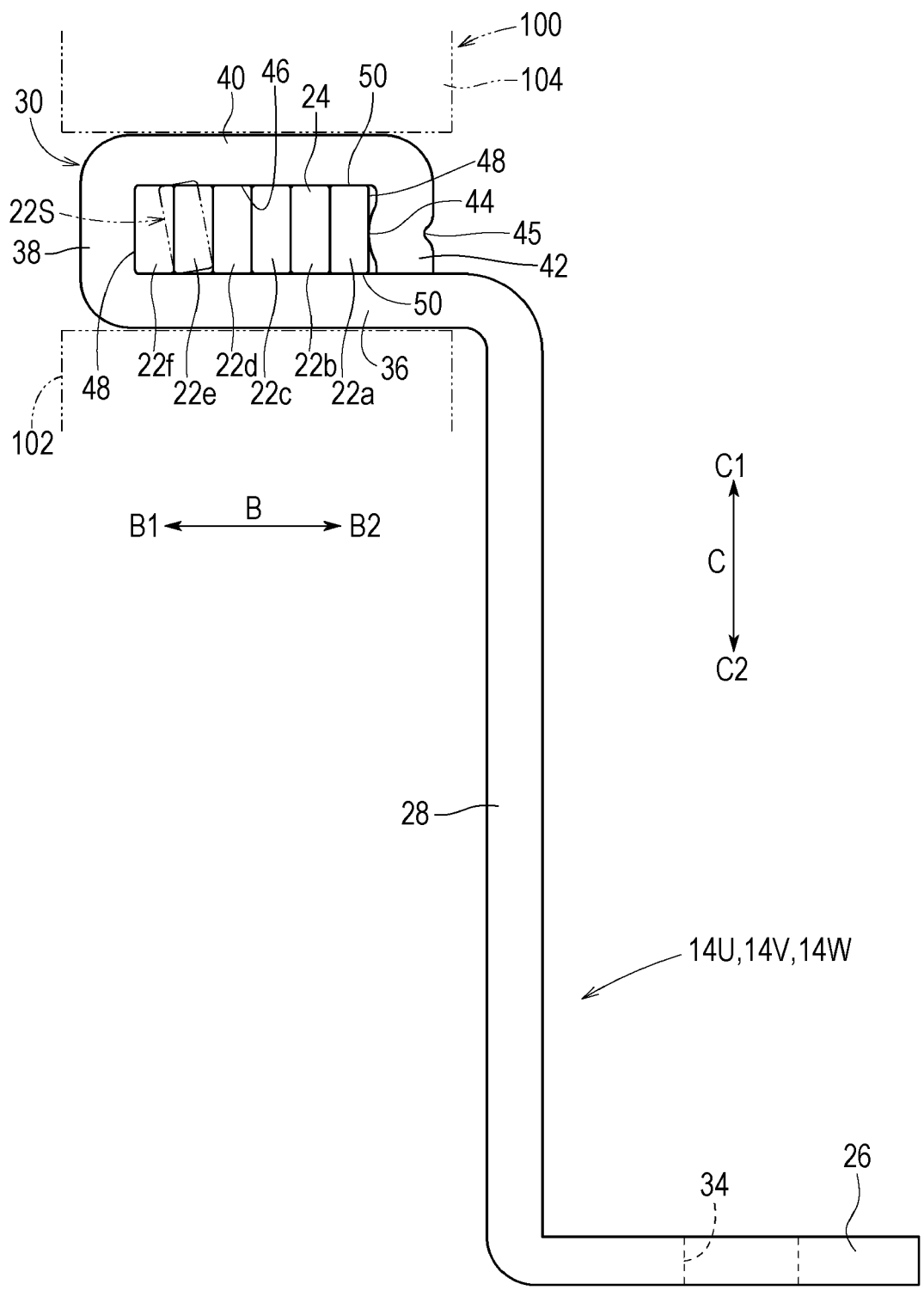
FIG. 3 is a side view of a connecting terminal illustrated in FIG. 1.
Figure 4:
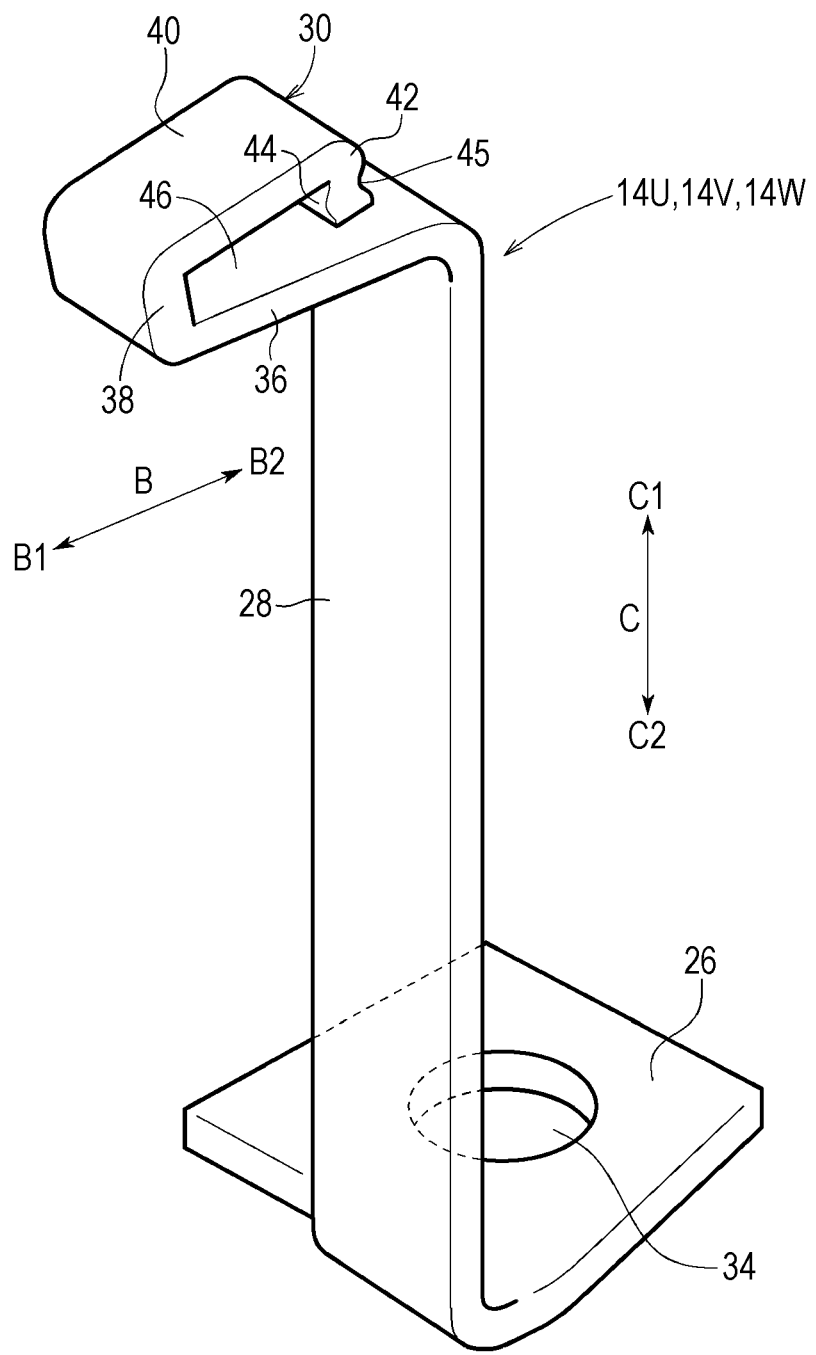
FIG. 4 is an external perspective view of the connecting terminal illustrated in FIGS. 1 and 2.

For example, as illustrated in FIGS. 2 and 3, each of the coils 22 is formed by a flat rectangular conductive wire of rectangular cross section, and the coils 22 of a plurality of phases (U-, V-, and W-phases) are wound on the stator core 20. Ends of the coils 22 of each phase are taken out toward an outer peripheral side (in a direction of arrow A) of the stator core 20, and coil end portions 24 of a plurality of (for example, six) coils 22 (22a to 22f) are bundled by the connecting terminals 14U, 14V, and 14W. The coil end portions 24 protrude from the stator core 20 in a radial outward direction (the direction of arrow A).

As illustrated in FIGS. 1 to 4, for example, each of the connecting terminals 14U, 14V, and 14W is formed by pressing a plate material having a fixed thickness, and includes a terminal-block connected portion 26 connected to a terminal block (not illustrated), an arm portion 28 joined to an end of the terminal-block connected portion 26, and a coil connecting portion 30 provided at an end of the arm portion 28 to hold the coils 22.

The terminal-block connected portion 26 has, at its center, a bolt hole 34 in which a bolt 32 is to be inserted. By inserting the bolt 32 (see FIG. 2) into the bolt hole 34 and screwing the bolt 32 in the unillustrated terminal block, each of the connecting terminals 14U, 14V, and 14W is connected and fixed to the terminal block.

As illustrated in FIGS. 3 to 5B, the coil connecting portion 30 includes a base portion 36 bent to be orthogonal to the arm portion 28, a vertical portion 38 bent at a right angle to the base portion 36, a lid portion 40 joined to an end of the vertical portion 38, and a joint portion 42 bent at a substantially right angle to the lid portion 40. That is, the coil connecting portion 30 is formed by the base portion 36, the vertical portion 38, the lid portion 40, and the joint portion 42 such as to have an inner space 46 and to be rectangular in cross section. The arm portion 28 is shaped like a straight line of a predetermined length. The arm portion 28 is joined at one end to the terminal-block connected portion 26, and at the other end to the coil connecting portion 30.

The base portion 36 is substantially parallel to the terminal-block connected portion 26, and extends a predetermined length from the arm portion 28 in a horizontal direction (in a direction of arrow B). A distal end of the base portion 36 is joined to the vertical portion 38. The vertical portion 38 extends a predetermined length in a direction away from the base portion 36 (a direction of arrow C1).

The lid portion 40 has a length substantially equal to that of the base portion 36, and is formed to be substantially parallel to the base portion 36 when the joint portion 42 joined to an end of the lid portion 40 is joined to an upper surface of the base portion 36.

The joint portion 42 is substantially parallel to the vertical portion 38 and has a length substantially equal to that of the vertical portion 38. The joint portion 42 is provided at a position offset from the arm portion 28 toward the vertical portion 38 (in a direction of arrow B1) by a predetermined distance.

The joint portion 42 includes a projection 44 projecting by a predetermined height from an inner wall surface of the joint portion 42 toward the vertical portion 38 (in the direction of arrow B1), and a recess 45 provided in an outer wall surface opposite the inner wall surface. For example, the projection 44 has a semicircular cross section. In other words, the projection 44 projects in the space 46 of the coil connecting portion 30 (in the direction of arrow B1).

In contrast, the recess 45 is depressed to a predetermined depth from the outer wall surface of the joint portion 42, and is located at a height substantially equal to that of the projection 44 from an end of the joint portion 42.

A plurality of coils 22 (22a to 22f) are stored in and connected to the space 46 of the coil connecting portion 30 that is surrounded by the base portion 36, the vertical portion 38, the lid portion 40, and the joint portion 42. In this case, the coils 22 are inserted in the space 46 to be orthogonal to the coil connecting portion 30. Further, the coils 22 are inserted such that first side faces 48 serving as long sides of the coils 22 are substantially parallel to the vertical portion 38 and second side faces 50 serving as short sides are in contact with the upper surface of the base portion 36 (see FIG. 3).

A coil 22a closest to the joint portion 42 (in a direction of arrow B2), of the coils 22, is pressed toward the vertical portion 38 (in the direction of arrow B1) by the projection 44, the remaining adjacent coils 22b, 22c, 22d, and 22e are also pressed toward the vertical portion 38 (in the direction of arrow B1) by the coil 22a, and a coil 22f closest to the vertical portion 38 (in the direction of arrow B1) is in contact with the vertical portion 38.

That is, a plurality of coils 22 (22a, 22b, 22c, 22d, 22e, and 22f) provided in the space 46 are held in a state in which the second side faces 50 are in contact with the base portion 36 and the first side faces 48 are clamped between the projection 44 of the joint portion 42 and the vertical portion 38. In this case, the nearly entire second side faces 50 of the coils 22 (22a, 22b, 22c, 22d, 22e, and 22f) are in uniform surface contact with the base portion 36 and the lid portion 40.

In other words, the projection 44 of the coil connecting portion 30 functions as a position regulation member that can regulate the positions (tilts) of the coils 22 in the space 46 by pressing the coils 22 toward the vertical portion 38 (in the direction of arrow B1).

The stator 10 for the rotating electric machine including the conductive terminals of the embodiment of the present disclosure is basically configured as described above. Next, a description will be given of how to connect a plurality of U-phase coils 22 (22a to 22f) to the connecting terminal 14U.

Figure 5A:
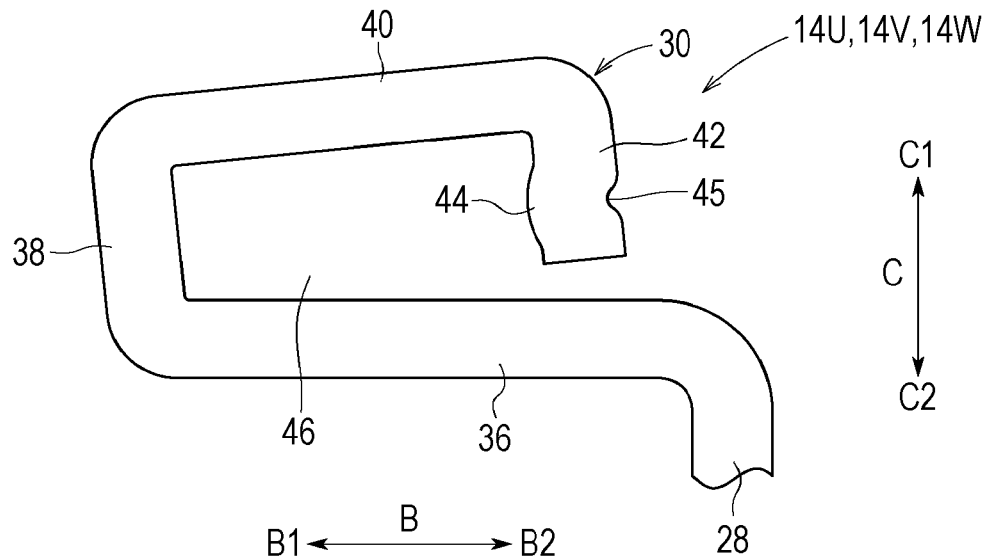
FIG. 5A is an enlarged side view illustrating a state before coils are inserted in a coil connecting portion of the connecting terminal.
Figure 5B:
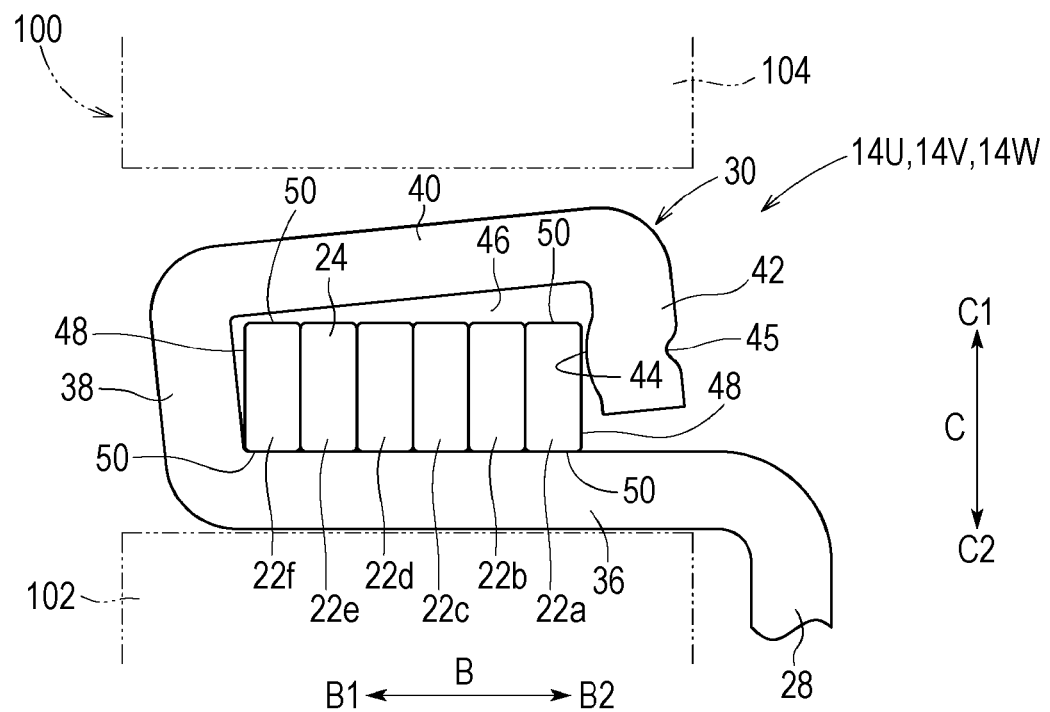
FIG. 5B is an enlarged side view illustrating a state after the coils are inserted in the coil connecting portion of FIG. 5A and before fusing is performed.

First, in an open state of FIG. 5A in which the joint portion 42 of the coil connecting portion 30 is separate from the base portion 36 in the connecting terminal 14U, the coil end portion 24 where the coils 22a to 22f of the same phase are bundled is inserted in the space 46 so that the second side faces 50 of the coils 22 are in contact with the upper surface of the base portion 36, as illustrated in FIG. 5B.

Next, as illustrated in FIG. 5B, a joining device 100 for performing fusing is prepared, the base portion 36 of the coil connecting portion 30 in which the coil end portion 24 is inserted is placed on an upper surface of a first electrode 102 of the joining device 100, and a second electrode 104 is then moved down toward the coil connecting portion 30 from above. End faces of the first and second electrodes 102 and 104 in the joining device 100 are flat, and are arranged substantially parallel to each other.

After the second electrode 104 is brought into contact with the lid portion 40 of the coil connecting portion 30, it is further pushed downward (in a direction of arrow C2), as illustrated in FIG. 3, whereby the lid portion 40 tilts on a joint portion to the vertical portion 38 and plastically deforms to be substantially parallel to the base portion 36.

Thus, the projection 44 provided in the joint portion 42 comes into contact with the first side face 48 of the coil 22a closest to the joint portion 42 (in the direction of arrow B2), and presses the coil 22a toward the vertical portion 38 (in the direction of arrow B1). Further, the end of the joint portion 42 is bent at the recess 45 toward the coils 22 (in the direction of arrow B1) when pressed by the second electrode 104. This allows the projection 44 to more reliably press the coil 22a (apply load to the coil 22a).

That is, since the recess 45 is provided in the outer wall surface of the joint portion 42, it functions as the position regulation member that positively deforms the end of the joint portion 42 toward the coils 22a to 22f (in the direction of arrow B1) to promote movement of the coils 22a to 22f toward the vertical portion 38 when pressed by the joining device 100.

The pressing force on the coil 22a is applied in a projecting direction of the projection 44 (in the direction of arrow B1), that is, in a direction substantially parallel to an extending direction of the base portion 36 (in the direction of arrow B1). As a result, the coil 22a closest to the joint portion 42 (in the direction of arrow B2) moves along the base portion 36 toward the vertical portion 38 (in the direction of arrow B1), and the remaining coils 22b to 22f close to the vertical portion 38 (in the direction of arrow B1) are also pushed toward the vertical portion 38 (in the direction of arrow B1).

As a result, the coils 22a to 22f are in tight contact with each other in the space 46 in a state in which the coil 22f closest to the vertical portion 38 (in the direction of arrow B1) is in contact with the vertical portion 38 with the first side face 48 being disposed therebetween and the coil 22a closest to the joint portion 42 (in the direction of arrow B2) is pressed by the projection 44 with the first side face 48 being disposed therebetween. In contrast, the second side faces 50 of the coils 22a to 22f are in contact with the base portion 36 and the lid portion 40 of the coil connecting portion 30.

Also, since current is supplied to the second electrode 104, when the end of the joint portion 42 is brought into contact with the base portion 36 by being pressed by the second electrode 104, the current flows from the second electrode 104 to the first electrode 102 via the joint portion 42 and the base portion 36, whereby the joint portion 42 is joined to the base portion 36. When this current flows from the coil connecting portion 30 to the coils 22a to 22f, it melts insulation coatings on surfaces of the coils 22a to 22f, whereby the coils 22a to 22f are electrically connected to the base portion 36 and the lid portion 40.

Thus, the coils 22a to 22f are electrically connected to and held in the connecting terminal 14U in a state in which the first side faces 48 are in contact with each other and the second side faces 50 are in contact with the base portion 36 and the lid portion 40.

Finally, in the connecting terminal 14U in which the coils 22a to 22f are thus connected to the coil connecting portion 30, the coils 22a to 22f are electrically connected to the unillustrated terminal block by connecting the terminal-block connected portion 26 to the terminal block.

A plurality of coils 22a to 22f are connected to each of the connecting terminals 14V and 14W similarly to the above-described manner in which the coils 22 are connected to the connecting terminal 14U. Hence, a detailed description thereof is skipped.

As described above, in this embodiment, in the connecting terminals 14U, 14V, and 14W for electrically connecting the coils 22 to the terminal block, the coil connecting portion 30, to which the coil end portion 24 of the bundled coils 22 is connected, is provided with the projection 44 projecting from the inner wall surface of the joint portion 42 on the open side. When the coils 22 inserted in the space 46 of the coil connecting portion 30 are connected by fusing, the first side faces 48 of the coils 22 are pressed and moved toward the vertical portion 38 (in the direction of arrow B1) by the projection 44. Thus, the coils 22 inserted in the coil connecting portion 30 are pushed toward the vertical portion 38 (in the direction of arrow B1) by the projection 44, and are thereby held and aligned on the base portion 36 in an upright manner. That is, the tilt of the coils 22 in the space 46 of the coil connecting portion 30 is prevented. The above-described "tilt" refers to a state in which the coils 22 are inclined a predetermined angle (22S) from an upright position on the base portion 36 (see FIG. 3), as illustrated by a two-dot chain line of FIG. 3.

As a result, the coils 22 provided in the coil connecting portion 30 can be electrically connected while being reliably in surface contact with the lid portion 40 and the base portion 36. This allows power to be stably supplied to the coils 22 via the connecting terminals 14U, 14V, and 14W.

Since the projection 44 and the recess 45 of the coil connecting portion 30 can be formed simultaneously with formation of the connecting terminals 14U, 14V, and 14W by pressing, the production cost and number of production steps are not increased.

Further, even when the number and shape of the coils 22 provided in the space 46 are changed, the projection 44 can easily hold the coils 22 by changing the projection height thereof from the inner wall surface of the joint portion 42.

In the above-described connecting terminals 14U, 14V, and 14W, the projection 44 is provided on the joint portion 42 of the coil connecting portion 30 and the second side faces 50 of the coils 22 are brought into uniform surface contact with the base portion 36 and the lid portion 40 by pressing the first side faces 48 of the coils 22 by the projection 44. Instead, for example, a length L1 of a joint portion 124 of a coil connecting portion (connecting portion) 122 may be set to be shorter than a length L2 of a vertical portion 38 (L1<L2) as in a connecting terminal 120 of a first modification illustrated in FIGS. 6A to 6C. In this case, the length L1 of the joint portion 124 is also set to be shorter than a height L3 of coils 22 (L1<L3), and the height L3 of the coils 22 is set to be shorter than the length L2 of the vertical portion 38 (L1<L3<L2).

Figure 6A:
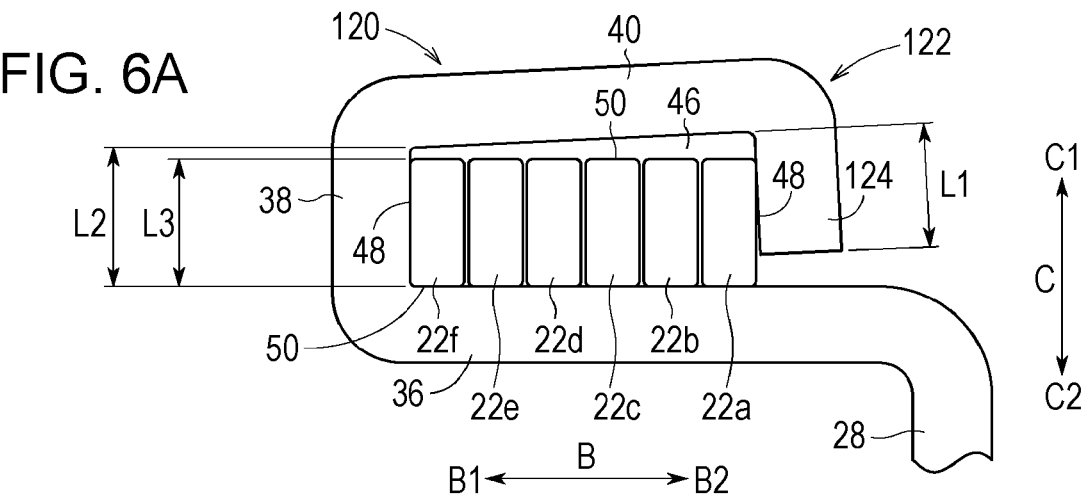
FIG. 6A is an enlarged side view illustrating a coil connecting portion and its surroundings in a connecting terminal according to a first modification.
Figure 6B:
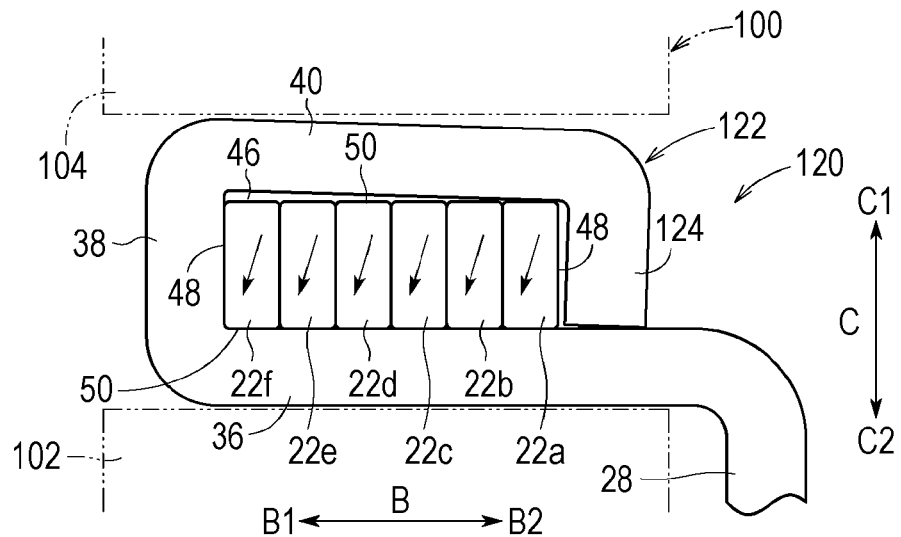
FIG. 6B is an enlarged side view illustrating a state in which a joint portion of the coil connecting portion of FIG. 6A contacts with a base portion and coils are pressed toward a vertical portion.

Thus, when a plurality of coils 22a to 22f are electrically connected to the coil connecting portion 122 by fusing, a lid portion 40 is pressed and deformed and an end of the joint portion 124 is brought into contact with an upper surface of a base portion 36, as illustrated in FIG. 6B, by moving a second electrode 104 down to press the lid portion 40 from above in a state of FIG. 6A. Since the length L1 of the joint portion 124 is shorter than the length L2 of the vertical portion 38, when the joint portion 124 contacts with the base portion 36, the lid portion 40 is joined with a side of the lid portion 40 near the joint portion 124 (in a direction of arrow B2) being inclined toward the base portion 36, that is, downward (in a direction of arrow C2).

As a result, a portion of a space 46 near the joint portion 124 (in the direction of arrow B2) is narrowed and a portion thereof near the vertical portion 38 (in a direction of arrow B1) is widened in the height direction (in a direction of arrow C) by the inclined lid portion 40. Hence, a coil 22a on the joint portion 124 side is pressed obliquely downward toward the vertical portion 38 (in the direction of arrow B1) by the lid portion 40, and the pressing force is also applied to the adjacent coils 22b to 22f. Thus, the coils 22a to 22f are pushed toward the vertical portion 38 (in the direction of arrow B1), and are aligned on the base portion 36 in an upright position.

Figure 6C:
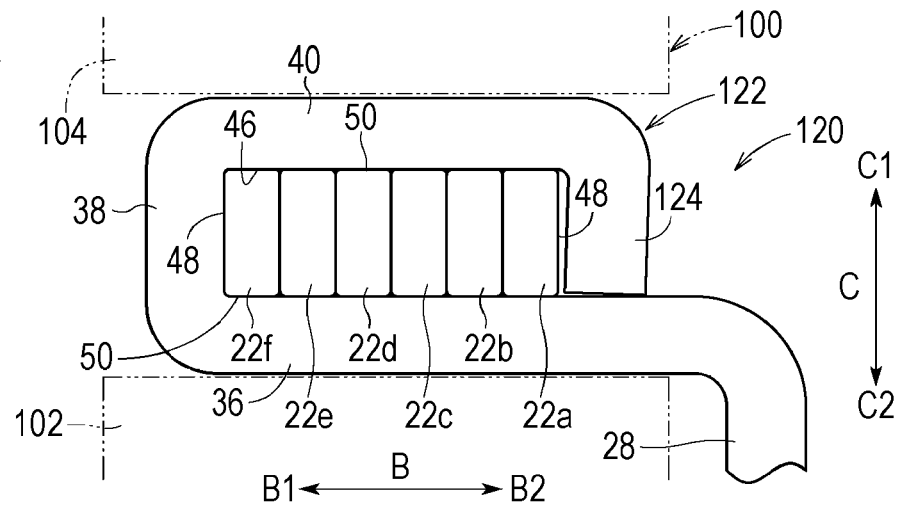
FIG. 6C is an enlarged side view illustrating a state in which the coils are connected to the coil connecting portion of FIG. 6B.

As illustrated in FIG. 6C, when the second electrode 104 is further moved down, the lid portion 40 is further pressed downward and deformed into contact with the coils 22a to 22f. Insulation coatings on the coils 22a to 22f are thereby melted, and the coils 22 and the lid portion 40 are connected electrically.

That is, in the connecting terminal 120 of the first modification, the length L1 of the joint portion 124 is set to be shorter than the length L2 of the vertical portion 38, and the lid portion 40 is inclined by design to slope downward to the joint portion 124 during fusing. This allows a plurality of coils 22a to 22f in the space 46 to move in the same direction (in the direction of arrow B1) when pressed by the lid portion 40. In other words, the coils 22a to 22f are prevented from moving in different directions (for example, the directions of arrows B1 and B2) in the space 46 during fusing.

For this reason, the coils 22 in the space 46 are held in a manner such that the first side faces 48 are substantially parallel to the vertical portion 38 and the second side faces 50 are in uniform surface contact with the base portion 36 and the lid portion 40.

By thus setting the length L1 of the joint portion 124 in the coil connecting portion 122 to be shorter than the length L2 of the vertical portion 38, the coils 22 can be aligned on the base portion 36 in an upright position and reliably connected without tilting in the space 46.

Figure 7A:
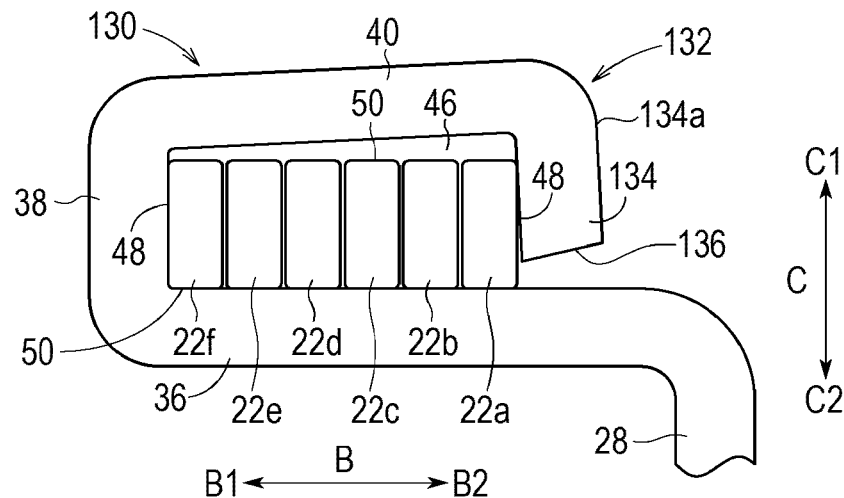
FIG. 7A is an enlarged side view illustrating a coil connecting portion and its surroundings in a connecting terminal according to a second modification.
Figure 7B:
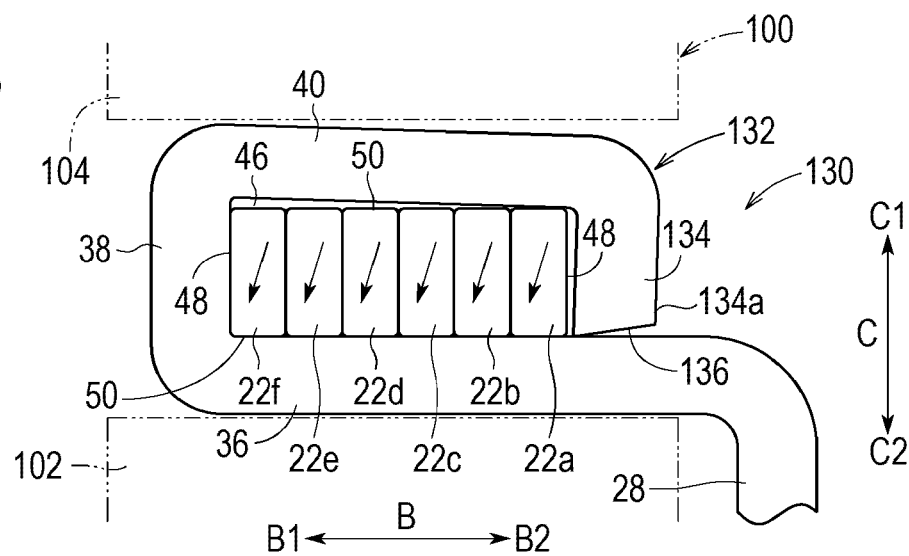
FIG. 7B is an enlarged side view illustrating a state in which a joint portion of the coil connecting portion of FIG. 7A contacts with a base portion and coils are pressed toward a vertical portion.
Figure 7C:
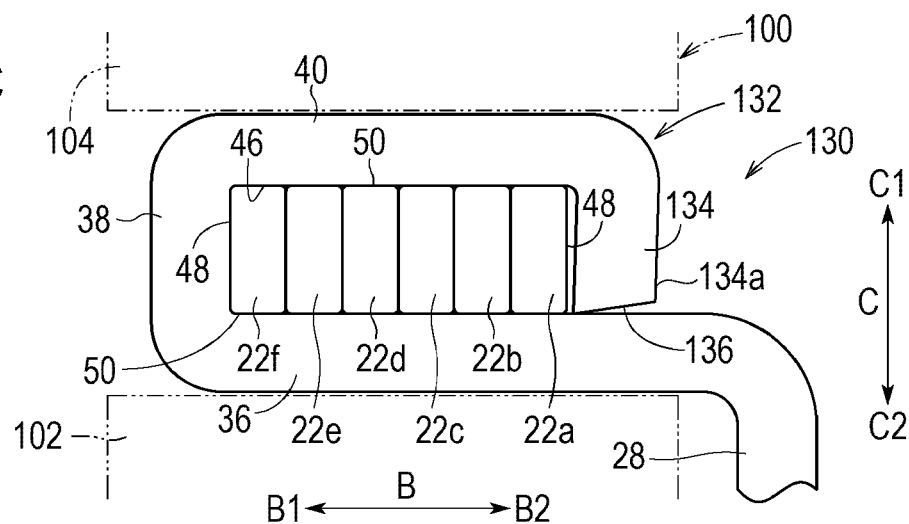
FIG. 7C is an enlarged side view illustrating a state in which the coils are connected to the coil connecting portion of FIG. 7B.

Instead of the above-described connecting terminal 120 of the first modification, a connecting terminal 130 according to a second modification may be used, as illustrated in FIGS. 7A to 7C. In the connecting terminal 130, an end of a joint portion 134 in a coil connecting portion (connecting portion) 132 has an inclined face 136 that gradually slopes upward (in a direction of arrow C1) toward an outer wall surface 134a.

In a case in which such a connecting terminal 130 is used, when a plurality of coils 22 are electrically connected to the coil connecting portion 132 by fusing, a lid portion 40 is pressed and deformed and the end of the joint portion 134 is brought into contact with an upper surface of a base portion 36, as illustrated in FIG. 7B, by pressing a second electrode 104 down to press the lid portion 40 from above in a state of FIG. 7A. Since the end is formed by the inclined face 136 that slopes upward (in the direction of arrow C1) away from a space 46, the joint portion 134 does not contact with the base portion 36 perpendicularly, but is joined with an upper portion of the joint portion 134 being slightly inclined outward. Also, the joint portion 134 is joined in a state in which a side of the lid portion 40 near the joint portion 134 (in the direction of arrow B2) is inclined toward the base portion 36, that is, downward (in a direction of arrow C2).

As a result, a portion of the space 46 near the joint portion 134 (in the direction of arrow B2) is narrow and a portion near the vertical portion 38 (in the direction of arrow B1) is wide in the height direction (in the direction of arrow C). Hence, a coil 22a near the joint portion 134 (in the direction of arrow B2) is pressed obliquely downward, and the pressing force is also applied to the remaining adjacent coils 22b to 22f, whereby the coils 22a to 22f are pressed toward the vertical portion 38, and are aligned on the base portion 36 in an upright position. For this reason, the coils 22 in the space 46 are held in a state in which first side faces 48 are substantially parallel to the vertical portion 38 and second side faces 50 are in uniform surface contact with the base portion 36 and the lid portion 40.

By further moving the second electrode 104 down, as illustrated in FIG. 7C, the lid portion 40 is further pressed downward, deformed, and brought into contact with the coils 22a to 22f to melt insulation coatings, whereby the lid portion 40 and the coils 22 are connected electrically.

That is, in the connecting terminal 130 of the second modification, the end of the joint portion 134 is formed by the inclined face 136, and the lid portion 40 is inclined by design to slope downward to the joint portion 134 during fusing. Hence, a plurality of coils 22a to 22f in the space 46 can be moved in the same direction (in the direction of arrow B1) when pressed by the lid portion 40. In other words, the coils 22a to 22f in the space 46 are prevented from moving in different directions (for example, the directions of arrows B1 and B2) during fusing.

By thus forming the inclined face 136 at the end of the joint portion 134 in the coil connecting portion 132, a plurality of coils 22a to 22f are prevented from tilting in the space 46, and can be reliably connected while being aligned in parallel in the coil connecting portion 132.

The conductive terminal according to the present disclosure is not limited to the above-described embodiment, and can adopt various structures without departing from the scope of the disclosure.

A conductive terminal according to an aspect of the embodiment includes a connecting portion in which a plurality of wires of rectangular cross section are arranged in parallel and to which the wires are electrically connected. The connecting portion covers the wires, and has, at a position facing at least one side surface of the wire located at an end in an arrangement direction of the wires, a position regulation member that regulates positions of the wires in the arrangement direction.

In the embodiment, the conductive terminal includes the connecting portion in which the wires of rectangular cross section are arranged in parallel and to which the wires are electrically connected, the connecting portion covers the wires, and has the position regulation member that regulates the positions of the wires in the arrangement direction. The position regulation member is provided at the position facing at least one side surface of the wire located at the end in the arrangement direction.

Therefore, for example, when the wires arranged in parallel are electrically connected to the connecting portion by fusing, the position regulation member is brought into contact with at least one side surface of the wire located at the end in the arrangement direction, and applies load to move the wires in the arrangement direction toward a side opposite the position regulation member. As a result, when a plurality of wires are connected in a bundle to the connecting portion, tilting of the wires in the arrangement direction can be prevented by applying the load from the position regulation member to the wires. Thus, the wires can be reliably connected to the connecting portion while being aligned in parallel.

Preferably, the position regulation member according to the embodiment is formed by a projection projecting toward the wires. In this case, when a plurality of wires are electrically connected to the connecting portion by fusing, load (pressing force) can be applied to the wires by the projection serving as the position regulation member. Hence, the wires can be prevented from tilting in the connecting portion.

Preferably, the position regulation member according to the embodiment is formed by a recess provided in a wall surface opposite a wall surface facing the wires. In this case, when the load is applied to the connecting portion by fusing, the connecting portion can be deformed on the recess toward the wires. The wires are pressed by the deformed portion, and so that the wires are prevented from tilting.

Preferably, the position regulation member according to the embodiment is provided in a joint portion provided in a part of a surface of the connecting portion covering the wires. A length of the joint portion in a direction orthogonal to the arrangement direction is set to be shorter than a length of a part of the connecting portion opposed to the joint portion and shorter than a length of a long side of the wires. In this case, when the wires are connected to the connecting portion by fusing, the connecting portion is inclined to slope downward to the joint portion. Hence, load (pressing force) is applied to the wires in a direction away from the joint portion, and this prevents the wires from tilting in the connecting portion.

Preferably, the position regulation member according to the embodiment is provided in a joint portion provided in a part of a surface of the connecting portion covering the wires, and an end of the joint portion is inclined in a direction away from the wires. In this case, when the wires are connected to the connecting portion by fusing, the connecting portion is inclined to slope downward to the joint portion having the inclined end. Hence, load is applied to the wires in a direction away from the joint portion, and this prevents the wires from tilting in the connecting portion.

Preferably, the connecting terminal according to the embodiment is applied to a rotating electric machine having a plurality of phases, and collectively connects end portions of the wires wound on divided cores of the same phase. This allows power to be reliably and stably supplied to wires of a plurality of phases.

Obviously, numerous modifications and variations of the present invention are possible in light of the above teachings. It is therefore to be understood that within the scope of the appended claims, the invention may be practiced otherwise than as specifically described herein.

What is claimed is:

1. A conductive terminal comprising:
   a connecting portion in which a plurality of wires each having a rectangular cross section are to be arranged in parallel and to which the wires are to be electrically connected, the connecting portion having a structure to cover the wires, the connecting portion comprising:

a position regulation member to regulate positions of the wires in an arrangement direction in which the wires are arranged, the position regulation member being provided to face at least one side surface of a wire located at an end of the wires in the arrangement direction.

2. The conductive terminal according to claim 1, wherein the position regulation member includes a projection projecting toward the wires.

3. The conductive terminal according to claim 1, wherein the position regulation member includes a first wall surface to face the wires, a second wall surface opposite to the first wall surface, and a recess provided in the second wall surface.

4. The conductive terminal according to claim 1, wherein the position regulation member is provided in a joint portion provided in a part of a surface of the connecting portion covering the wires, and wherein a length of the joint portion in a direction orthogonal to the arrangement direction is set to be shorter than a length of a part of the connecting portion opposed to the joint portion and shorter than a length of a long side of the wires.

5. The conductive terminal according to claim 1, wherein the position regulation member is provided in a joint portion provided in a part of a surface of the connecting portion covering the wires, and wherein an end of the joint portion is inclined in a direction away from the wires.

6. The conductive terminal according to claim 1, wherein the conductive terminal is to be applied to a rotating electric machine having a plurality of phases, and is provided to collectively connect end portions of the wires wound on divided cores having a same phase.

7. The conductive terminal according to claim 1, wherein the position regulation member includes a first wall surface to face the wires, a second wall surface opposite to the first wall surface, and a projection provided in the first wall surface, and wherein the projection projects toward the wires and is contactable with the wire located at the end of the wires in the arrangement direction.

* * * * *